United States Patent
Kang et al.

(10) Patent No.: US 8,078,159 B2
(45) Date of Patent: Dec. 13, 2011

(54) APPARATUS AND METHOD OF RELAY STATION (RS) FOR REPORTING MOBILE STATION (MS)-RS CHANNEL STATE IN MULTIHOP RELAY BROADBAND WIRELESS ACCESS (BWA) COMMUNICATION SYSTEM

(75) Inventors: Hyun-Jeong Kang, Seoul (KR); Jung-Je Son, Seongnam-si (KR); Hyoung-Kyu Lim, Seoul (KR); Yeong-Moon Son, Anyang-si (KR); Sung-Jin Lee, Seoul (KR); Joon-Young Choi, Suwon-si (KR); Pan-Yuh Joo, Seoul (KR)

(73) Assignee: Samsung Electronics Co., Ltd (KR)

( * ) Notice: Subject to any disclaimer, the term of this patent is extended or adjusted under 35 U.S.C. 154(b) by 683 days.

(21) Appl. No.: 11/708,690

(22) Filed: Feb. 20, 2007

(65) Prior Publication Data

US 2007/0213065 A1 Sep. 13, 2007

(30) Foreign Application Priority Data

Feb. 20, 2006 (KR) .................. 10-2006-0015970

(51) Int. Cl.
*H04W 24/00* (2009.01)
(52) U.S. Cl. .......................... 455/425; 455/7
(58) Field of Classification Search .......... 455/445–459, 455/7, 9, 24, 561, 423, 425, 452.2
See application file for complete search history.

(56) References Cited

U.S. PATENT DOCUMENTS

| | | | | |
|---|---|---|---|---|
| 5,740,530 A | * | 4/1998 | Labedz et al. | 455/403 |
| 6,603,753 B1 | * | 8/2003 | Bedekar et al. | 370/335 |
| 7,184,703 B1 | * | 2/2007 | Naden et al. | 455/10 |
| 2002/0051425 A1 | * | 5/2002 | Larsson | 370/252 |
| 2004/0242154 A1 | * | 12/2004 | Takeda et al. | 455/16 |
| 2004/0266339 A1 | * | 12/2004 | Larsson | 455/7 |
| 2005/0232183 A1 | * | 10/2005 | Sartori et al. | 370/319 |
| 2006/0252367 A1 | * | 11/2006 | Haartsen | 455/11.1 |
| 2007/0286066 A1 | * | 12/2007 | Zhang et al. | 370/208 |

FOREIGN PATENT DOCUMENTS

| | | |
|---|---|---|
| KR | 100259868 | 3/2000 |
| KR | 1020030057467 | 7/2003 |
| KR | 1020070070379 | 7/2007 |
| KR | 1020070075748 | 7/2007 |

* cited by examiner

*Primary Examiner* — Steven Lim
(74) *Attorney, Agent, or Firm* — The Farrell Law Firm, P.C.

(57) ABSTRACT

Disclosed are an apparatus and method of a Relay Station (RS) in a multihop relay Broadband Wireless Access (BWA) communication system. The method includes an RS for receiving a signal level threshold of the MS from a Base Station (BS), measuring a signal level of the MS, and transmitting the MS signal level to the BS when the measured signal level is greater than the signal level threshold; and the BS for transmitting the MS signal level threshold to one or more RSs and receiving MS signal levels from the RSs.

15 Claims, 6 Drawing Sheets

APPARATUS AND METHOD OF RELAY STATION (RS) FOR REPORTING MOBILE STATION (MS)-RS CHANNEL STATE IN MULTIHOP RELAY BROADBAND WIRELESS ACCESS (BWA) COMMUNICATION SYSTEM

PRIORITY

This application claims priority under 35 U.S.C. §119 to an application filed in the Korean Intellectual Property Office on Feb. 20, 2006, and assigned Serial No. 2006-0015970, the contents of which are incorporated herein by reference.

BACKGROUND OF THE INVENTION

1. Field of the Invention

The present invention relates generally to a multihop relay Broadband Wireless Access (BWA) communication system, and, in particular, to an apparatus and method of Relay Station (RS) for reporting Mobile Station (MS)-RS channel state to provide a transparent relay service to the MS.

2. Description of the Related Art

In fourth generation (4G) communication systems, research has been conducted to provide users with various Quality of Service (QoS) at a data rate over 100 Mbps. Specifically, research into the high rate service support to guarantee mobility and QoS in Broadband Wireless Access (BWA) communication systems, such as Local Area Networks (LAN) and Metropolitan Area Networks (MAN), has been under way. Representative systems of the BWA communication system include Institute of Electrical and Electronics Engineers (IEEE) 802.16d and 802.16e communication systems.

IEEE 802.16d and 802.16e communication systems adapt an Orthogonal Frequency Division Multiplexing (OFDM)/Orthogonal Frequency Division Multiple Access (OFDMA) scheme for physical channels. An IEEE 802.16d communication system addresses the fixed Subscriber Station (SS). That is, an IEEE 802.16d communication system does not take into account the mobility of the SS, but only the single cell structure. By contrast, an IEEE 802.16e communication system addresses the mobility of the SS, which is updated from the IEEE 802.16d communication system. The mobile SS is referred to as a Mobile Station (MS).

Figure 1:
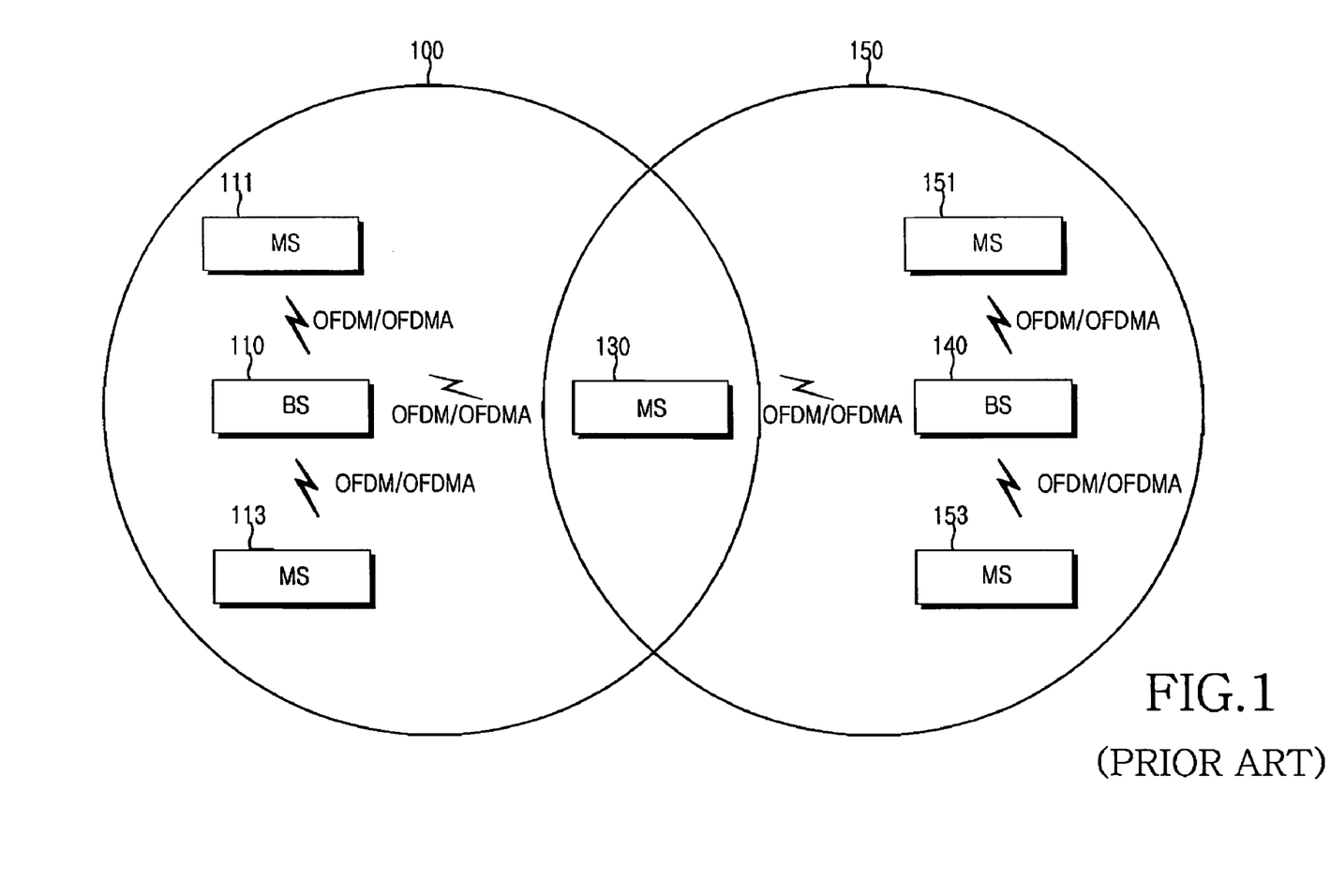
FIG. 1 depicts a general IEEE 802.16e communication system.

FIG. 1 shows a general IEEE 802.16e communication system.

In FIG. 1, the IEEE 802.16e communication system has a multi cell architecture, that is, a cell 100 and a cell 150. The IEEE 802.16e communication system includes a Base Station (BS) 110 managing cell 100, a BS 140 managing cell 150, and a plurality of MSs 111, 113, 130, 151, and 153. Signals are transmitted and received between BSs 110 and 140 and MSs 111, 113, 130, 151, and 153 using an OFDM/OFDMA scheme. Of the MSs 111, 113, 130, 151, and 153, MS 130 resides in the overlapping area of cells 100 and 150; that is, in a handover region. When the MS 130 migrates to cell 150 managed by BS 140 while transmitting and receiving signals to and from BS 110, the serving BS of MS 130 is changed from BS 110 to BS 140.

By signaling through the direct links between the fixed BS and the MSs as shown in FIG. 1, the general IEEE 802.16e communication system can easily configure highly reliable wireless communication links between the BS and the MSs. However, since the position of the BS is fixed, the IEEE 802.16e communication system is subject to the low flexibility of the radio network configuration. Thus, it is hard to provide efficient communication services in a radio communication environment suffering severe changes of traffic distribution or traffic demand.

To overcome these shortcomings, a data delivery scheme using a multihop relay having a fixed relay station, a mobile relay station, or general MSs is applicable to a general cellular wireless communication system such as an IEEE 802.16e communication system is provided. A wireless communication system using a multihop relay scheme can reconfigure the network by promptly coping with the changes of the communication environment, to utilize the entire radio network more efficiently. For instance, a multihop relay wireless communication system is able to expand the cell service area and increase system capacity. That is, under poor channel conditions between a BS and an MS, better radio channel status can be provided to the MS by installing a relay station between the BS and the MS and establishing a multihop relay path via the relay station. Also, by adopting a multihop relay scheme in a cell boundary of a poor channel status from the BS, a high speed data channel can be provided and the cell service area can be expanded.

Hereinafter, descriptions are provided on a structure of a multihop relay wireless communication system for expanding the service area of a BS.

Figure 2:
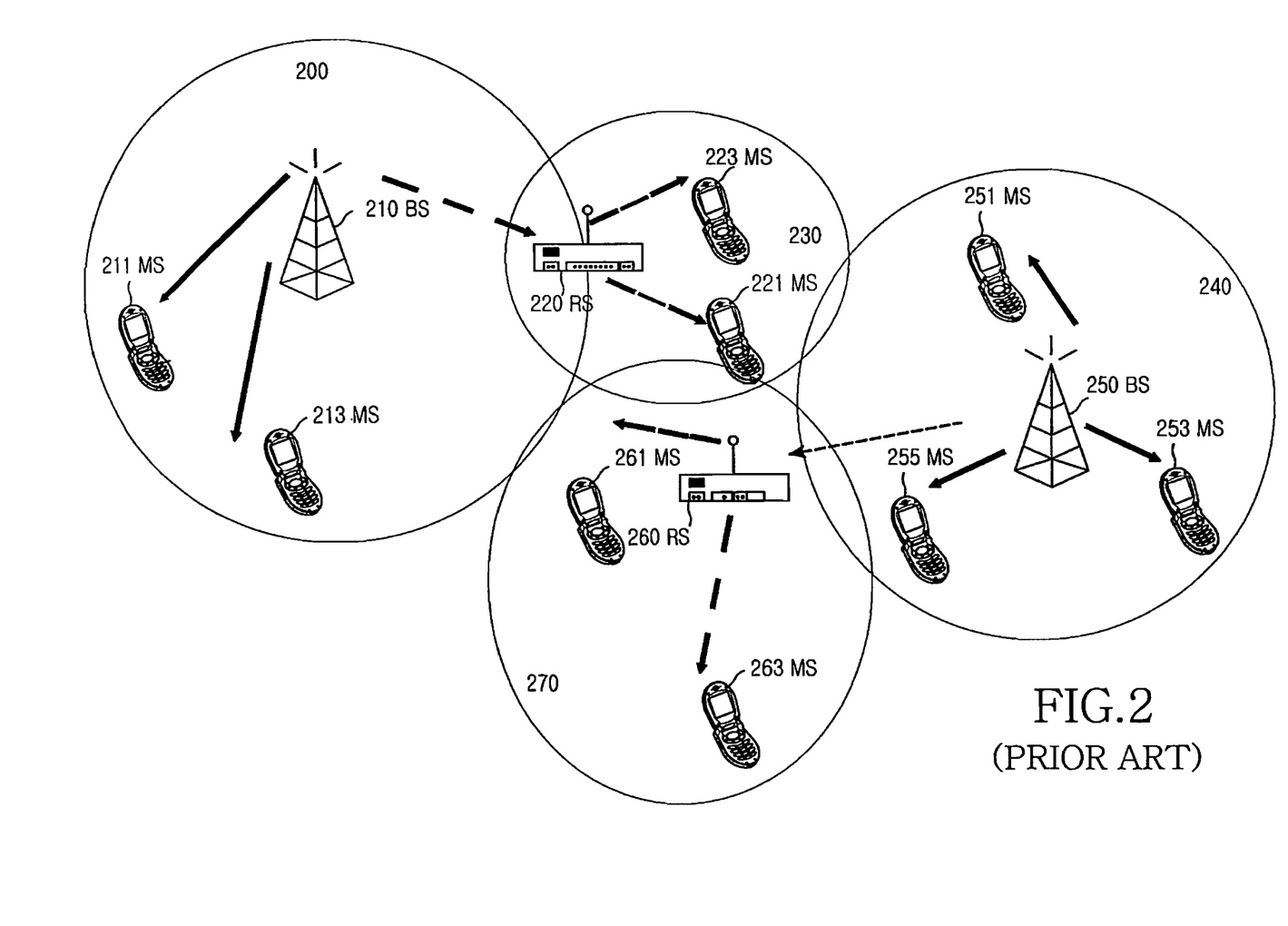
FIG. 2 depicts a multihop relay broadband wireless communication system to expand a service area of a BS.

FIG. 2 shows a broadband wireless communication system using a multihop relay scheme for extending the service area of the BS.

The multihop relay wireless communication system in FIG. 2 has a multicell architecture, that is, a cell 200 and a cell 240. The multihop relay wireless communication system includes a BS 210 managing cell 200, a BS 250 managing cell 240, MSs 211 and 213 located in cell 200, MSs 221 and 223 managed by the BS 210 but located in an area 230 outside of cell 200, a Relay Station (RS) 220 providing multihop relay paths between BS 210 and MSs 221 and 223 in area 230, MSs 251, 253 and 255 located in cell 240, MSs 261 and 263 managed by BS 250 but located in an area 270 outside of cell 240, and a relay station 260 providing multihop relay paths between BS 250 and MSs 261 and 263 in area 270. Signals are transmitted and received among BSs 210 and 250, relay stations 220 and 260, and MSs 211, 213, 221, 223, 251, 253, 255, 261, and 263 using an OFDM/OFDMA scheme.

MSs 211 and 213 and relay station 220, which belong to cell 200, can transmit and receive signals directly to and from the BS 210, whereas MSs 221 and 223 in the area 230 can not transmit and receive signals directly to and from BS 210. Hence, relay station 220 manages area 230 and relays signals between BS 210 and MSs 221 and 223, which are incapable of transceiving signals directly. MSs 221 and 223 can transceive signals with BS 210 via relay station 220. Likewise, MSs 251, 253 and 255 and relay station 260, which belong to cell 240, can transmit and receive signals directly to and from BS 250, whereas MSs 261 and 263 in area 270 can not transmit and receive signals directly to and from BS 250. Hence, relay station 260 manages area 270 and relays signals between BS 250 and MSs 261 and 263, which are incapable of transceiving signals directly. MSs 261 and 263 can transceive signals with the BS 250 via the relay station 260.

Figure 3:
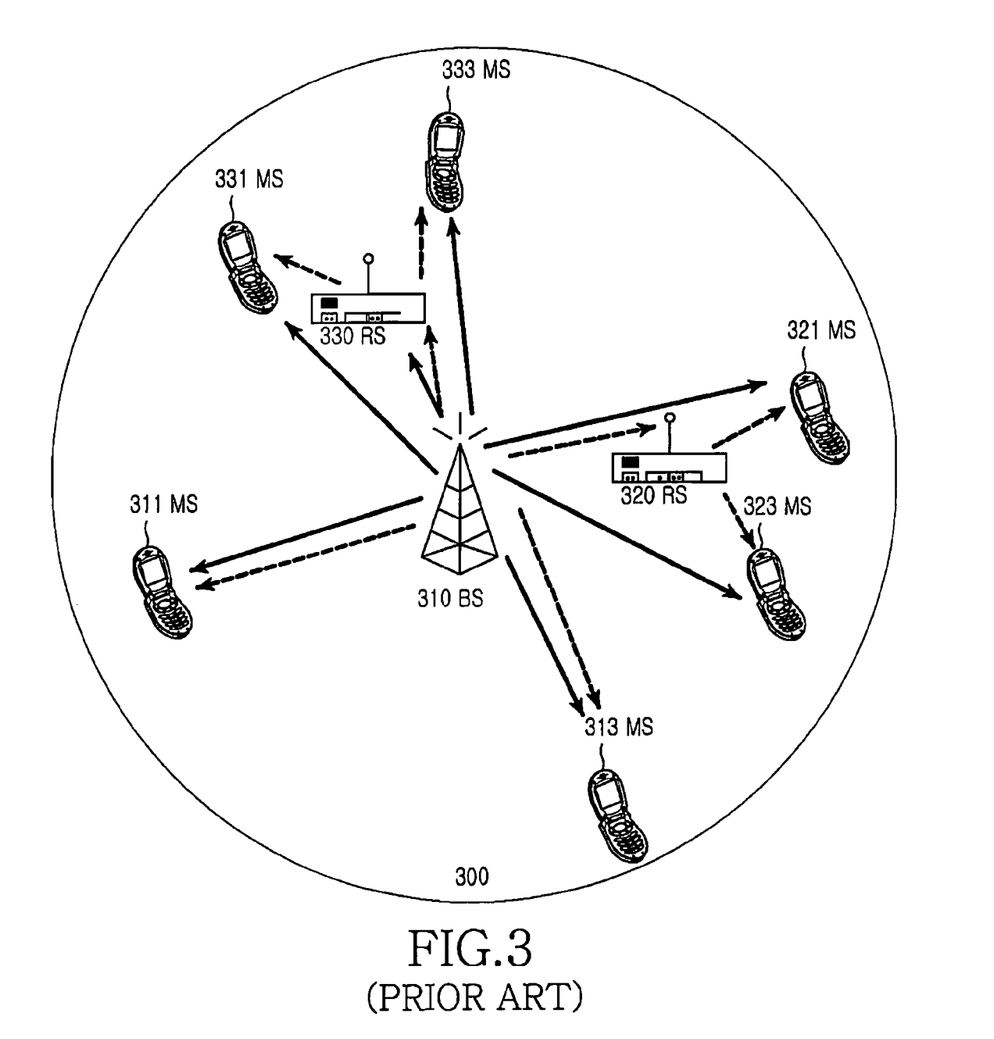
FIG. 3 depicts a multihop relay broadband wireless communication system to increase system capacity.

FIG. 3 shows a broadband wireless communication system using a multihop relay scheme for expanding the system capacity.

The multihop relay wireless communication system in FIG. 3 includes a BS 310, MSs 311, 313, 321, 323, 331 and 333, and relay stations 320 and 330, which provide multihop relay paths between BS 310 and MSs 311, 313, 321, 323, 331 and 333. Signals are transmitted and received among BS 310, relay stations 320 and 330, and MSs 311, 313, 321, 323, 331 and 333 according to the OFDM/OFDMA scheme. BS 310 manages a cell 300. MSs 311, 313, 321, 323, 331 and 333 and relay stations 320 and 330, belonging to the cell 300, are capable of transmitting and receiving signals directly to and from BS 310.

However, when some of MSs 321, 323, 331 and 333 travel close to the boundary of cell 300, a Signal-to-Noise Ratio (SNR) of the direct links between BS 310 and some of MSs 321, 323, 331 and 333 may be low. Thus, relay station 320 relays the unicast traffic of BS 310 and MSs 321 and 323, and MSs 321 and 323 transmit and receive the unicast traffics to and from the BS 310 via relay station 320. Likewise, relay station 330 relays the unicast traffic of BS 310 and MSs 331 and 333, and MSs 331 and 333 transmit and receive the unicast traffic to and from BS 310 via relay station 330. That is, relay stations 320 and 330 raise the effective data rate of MSs 321, 323, 331 and 333 and increase the system capacity by providing high-speed data delivery paths to the MSs.

In a broadband wireless communication system using a multihop relay scheme of FIG. 2 or 3, relay stations 220, 260, 320 and 330 may be infrastructure relay stations which are installed by a service provider and already known to BSs 210, 250 and 310 for their management, or client relay stations which serve as subscriber stations (e.g., SSs or MSs) in some cases and relay stations in other cases. Also, relay stations 220, 260, 320 and 330 may be fixed relay stations, nomadic relay stations (e.g., notebook computers), or mobile relay stations such as MSs.

As discussed above, in a multihop relay wireless communication system, an RS is a relay station for cell expansion, which supports the relay between an MS outside a BS region and a BS, or a relay station for cell capacity increase, to support the relay between an MS within the BS region and the BS.

In the mean time, when utilizing an RS for cell area expansion or cell capacity increase, a relay service of the RS can be provided without informing the MS of the presence of the RS; that is, by making the MS recognize the data transmission and reception with the BS. This is referred to as a transparent relay. To provide a transparent relay to the MS, a new signaling process should be defined between the BS and the RS. Primarily, it is necessary to define a new signaling process between the BS and the MS to select an RS which will provide the transparent service to the MS.

SUMMARY OF THE INVENTION

An aspect of the present invention is to substantially solve at least the above problems and/or disadvantages and to provide at least the advantages below. Accordingly, an aspect of the present invention is to provide an apparatus and method of an RS for reporting an MS-RS channel state to provide a transparent relay service to the MS in a multihop relay BWA communication system.

Another aspect of the present invention is to provide an apparatus and method for reporting RS-MS signal level information when selecting an RS which will provide a transparent relay service to an MS in a multihop relay BWA communication system.

A further aspect of the present invention is to provide an apparatus and method for providing a relay service to an MS based on an MS signal level threshold in a multihop relay BWA communication system.

The above aspects are achieved by providing an operation method of an RS for a transparent relay service to an MS in a multihop relay BWA communication system, including receiving a signal level threshold of the MS from a BS; measuring a signal level of the MS; and transmitting the signal level of the MS to the BS when the measured signal level is greater than the signal level threshold.

According to one aspect of the present invention, an apparatus for providing a transparent relay service to an MS in a multihop relay BWA communication system, includes an RS for receiving a signal level threshold of the MS from a BS, measuring a signal level of the MS, and transmitting the MS signal level to the BS when the measured signal level is greater than the signal level threshold; and the BS for transmitting the MS signal level threshold to one or more RSs and receiving MS signal levels from the RSs.

According to another aspect of the present invention, a method for providing a transparent relay service to an MS in a multihop relay BWA communication system, includes transmitting, at a BS, an MS signal level threshold to one or more RSs; receiving, at the RS, the MS signal level threshold from the BS, measuring an MS signal level, and transmitting the MS signal level to the BS when the measured signal level is greater than the signal level threshold; and receiving, at the BS, MS signal levels from the one or more RSs.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method of an Relay Station (RS) for reporting a Mobile Station (MS)-RS channel state to provide a transparent relay service to an MS in a multihop relay Broadband Wireless Access (BWA) communication system.

The multihop relay BWA communication system adopts, by way of example, an Orthogonal Frequency Division Multiplexing (OFDM)/Orthogonal Frequency Division Multiple Access (OFDMA) scheme, and thus transmits a physical channel signal using a plurality of subcarriers. Accordingly, high speed data transmission is achieved to support mobility of the MS in a multi-cell architecture.

In the multihop relay BWA communication system, an RS may be a fixed or mobile node, depending upon a specific system installed by a provider, or a general SS. In other words, a node having the above property can be selected as the RS based on RS capability negotiation with the BS for the cell coverage expansion or the cell capacity increase of the BS.

Figure 4:
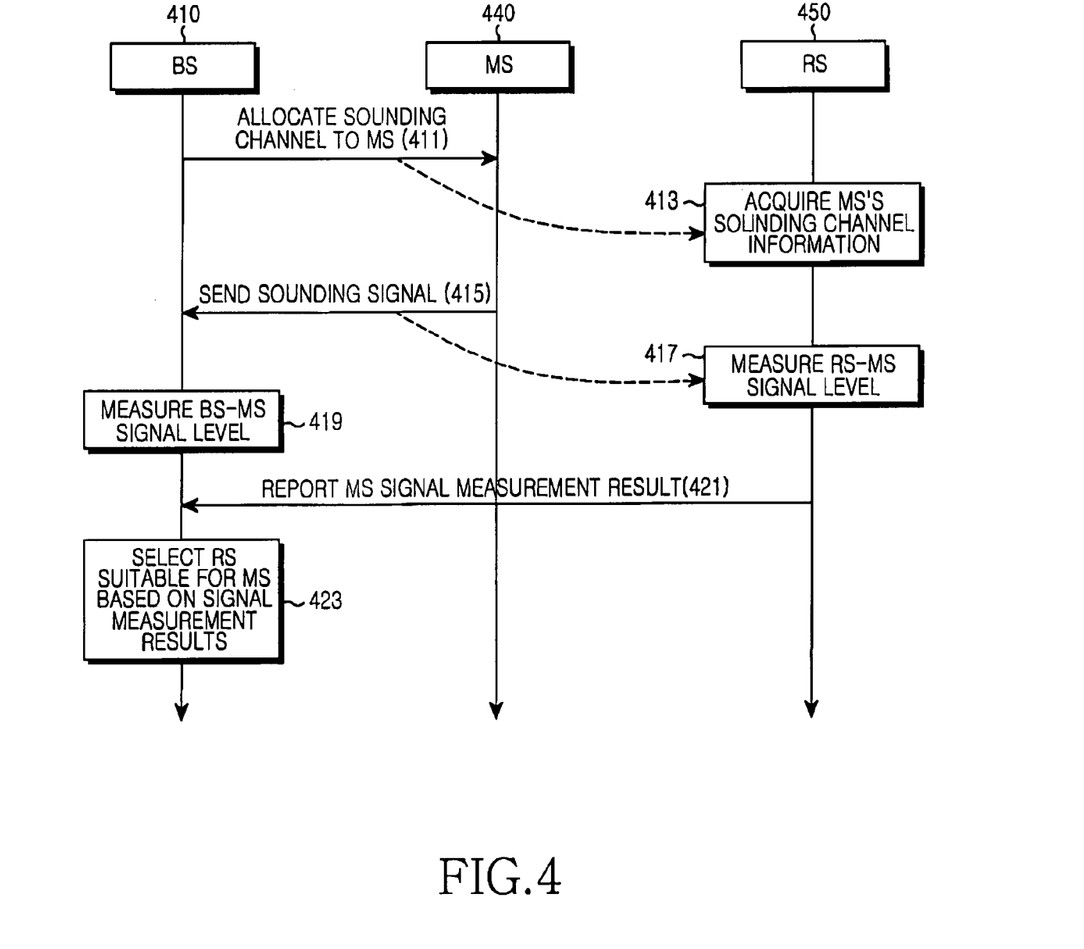
FIG. 4 depicts signal flows between a BS, an RS, and an MS to provide a transparent relay service to the MS in a multihop relay broadband wireless communication system according to the present invention.

FIG. 4 shows signal flows between a BS, an RS, and an MS to provide a transparent relay service to the MS in a multihop relay broadband wireless communication system according to the present invention.

In step 411, the BS 410 allocates a sounding channel zone to the MS 440. The sounding channel zone information is expressed as Peak to Average Power Ratio (PAPR)_Reduction_Safety_and_Sounding_Zone_Allocation_IE corresponding to Uplink Interval Usage Code (UIUC) of an Uplink-Media Access Protocol Information Element (UL-MAP IE) transmitted from the BS 410.

The PAPR_Reduction_Safety and_Sounding Zone_Allocation_IE structure is shown in Table 1.

TABLE 1

| Syntax | Size (bits) | Notes |
|---|---|---|
| PAPR_Reduction_Safety_and_Sounding_Zone_Allocation_IE{ | | |
|   OFDMA symbol offset | 8 | |
|   Subchannel offset | 7 | |
|   No.OFDMA symbols | 7 | |
|   No.subchannels | 7 | |
|   PAPR Reduction/safety Zone | 1 | 0 = PAPR reduction allocation<br>1 = Safety zone Allocation |
|   Sounding Zone | 1 | 0 = PAPR/safety Zone<br>1 = Sounding Zone Allocation |
|   Reserved | 1 | Shall be set to zero |
| } | | |

In regard to the PAPR_Reduction_Safety_and_Sounding_Zone_Allocation_IE of Table 1, 'OFDMA symbol offset' indicates a symbol offset of the sounding channel zone, 'Subchannel offset' indicates a subchannel offset of the sounding channel zone, 'No.subchannels' indicates the number of allocated subchannels, 'No.OFDMA symbols' indicates the number of allocated OFDMA symbols, 'PAPR Reduction/safety Zone' indicates whether the zone is allocated for the PAPR reduction or the Safety zone, and 'Sounding Zone' indicates whether the zone is allocated for PAPR/Safety Zone or sounding zone.

The BS 410 transmits UL_Sounding_Command_IE to direct a sounding signal transmission method of the MS in the allocated sounding zone of Table 1.

The UL_Sounding_Command_IE structure is shown in Table 2.

TABLE 2

| Syntax | Size (bits) | Notes |
|---|---|---|
| UL_Sounding_Command_IE{ | | |
|   Extended-2 UIUC | 4 | UL_sounding_command_IE=0x04 |
|   Length | 8 | variable |
|   Sounding_Type | 1 | 0 = Type A<br>1 = Type B |
|   Send Sounding Report Flag | 1 | |
|   Sounding_Relevance_Flag | 1 | 0 = Sounding relevance is the same for all CIDs<br>1 = Sounding relevance is specified for each CID |
|   If(Sounding_Relevance_Flag==0){ | | |
|     Sounding_Relevance | 1 | 0 = All CIDs respond in the frame carrying the instruction<br>1 = All CIDs respond in next frame |
|     reserved | 2 | Shall be set to zero |
|   } else { | | |
|     reserved | 3 | Shall be set to zero |
|   } | | |
|   Include additional feedback | 2 | 0b00 = No additional feedback<br>0b01 = include channel coefficients (See 8.4.6.2.7.3)<br>0b10 = include received pilot coefficients<br>0b11 = include feedback message |
|   if (Sounding_Type==0) { | | |
|     Num_Sounding_symbols | 3 | Total number of sounding symbols being allocated, from 1 (0b000) to $2^3$ = 8 (0b111) |
|     Separability Type | 1 | 0:occupy all subcarriers in the assigned bands;<br>1:occupy decimated subcarriers |
|     if(Separability type==0) { | | (using cyclic shift separability) |
|       Max Cyclic Shift Index P | 3 | 0b000: P = 4;<br>0b001: P = 8;<br>0b010: P = 16;<br>0b011: P = 32;<br>0b100: P = 9;<br>0b101: P = 18;<br>0b110-0b111: reserved, |
|       reserved | 1 | Shall be set to zero. |
|     } else { | | (using decimation separability) |
|       Decimation Value D | 3 | Sound every $D^{th}$ subcarrier within the sounding allocation. Decimation value D is 2 to the power of (1 plus this value), hence 2, 4, 8, up to maximum of 128, and 0b111 means decimation of 5. |
|       Decimation offset randomization | 1 | 0 = no randomization of decimation offset<br>1 = decimation offset pseudo-randomly determined |
|     } | | |
|     for (i=0;i<Num_Soudning_symbols;i++){ | | |
|       Sounding symbol index | 3 | Symbol index within the Sounding Zone, from 1 (value 0b000) to $2^3$ = 8 (value 0b111) |
|       Number of CIDs | 6 | Number of CIDs sharing this sounding allocation |
|       reserved | 3 | Shall be set to zero |
|       for (j=0;j<Num. of CIDs;j++) { | | |

TABLE 2-continued

| Syntax | Size (bits) | Notes |
|---|---|---|
| Shorted basic CID | 12 | 12 LSBs of the MS basic CID value |
| Power Assignment Method | 2 | 0b00 = equal power;<br>0b01 = reserved;<br>0b10 = Interference dependent. Per subcarrier power limit;<br>0b11 = Interference dependent. Total power limit. |
| Power boost | 1 | 0 = no power boost<br>1 = power boost |
| Multi-Antenna Flag | 1 | 0 = MS sounds first antenna only<br>1 = MS sounds all antennas |
| Allocation Mode | 1 | 0: Normal<br>1: Band AMC |
| If (Allocation Mode ==1) { | | |
| Band bit Map | 12 | See logical band defined in 6.3.18. |
| reserved | 2 | Shall be set to zero. |
| } Else { | | |
| Starting Frequency Band | 7 | Out of 96 bands at most (FFT size dependent) |
| Number of frequency bands | 7 | Contiguous bands used for sounding |
| } | | |
| If (Sounding Relevance Flag==1) { | | |
| Sounding_Relevance | 1 | |
| } else { | | |
| reserved | 1 | Shall be set to zero. |
| } | | |
| if (Separability Type ==0) { | | |
| Cyclic time shift index m | 5 | Cyclically shifts the time domain symbol by multiples (from 0 to P−1) of N/P where N = FFT size, and P = Max Cyclic Shift Index. |
| } else { | | |
| Decimation Offset d | 6 | Relative starting offset position for the first sounding occupied subcarrier in the sounding allocation |
| If (Include additional feedback ==0b01) { | | |
| Use same symbol for additional feedback | 1 | 0 = the additional feedback is sent in the symbol(s) following the allocated sounding symbol<br>1 = the additional feedback is sent in the same symbol as the allocated sounding symbol |
| reserved | 2 | Shall be set to zero. |
| } else { | | |
| reserved | 3 | Shall be set to zero. |
| } | | |
| } | | |
| Periodicity | 3 | 0b000 = single command, not periodic, or terminate periodicity. Otherwise, repeat sounding once per r frames, where $r = 2^{(n-1)}$, where n is the decimal equivalent of the periodicity field |
| } | | |
| } | | |
| } else { | | |
| Permutation | 3 | 0b000 = PUSC perm.<br>0b001 = FUSC perm<br>0b010 = Optional FUSC perm.<br>0b011 = PUSC-ASCA<br>0b100 = TUSC1<br>0b101 = TUSC2<br>0b110 = AMC (2 x 3)<br>0b111 = Reserved |
| DL_PermBase | 6 | |
| Num_Sounding_symbols | 3 | |
| for (i=0;i<Num_Sounding_symbols;i++){ | | |
| Number of CIDs | 7 | |
| reserved | 1 | Shall be set to zero. |
| for (j=0;j<Number of CIDs;j++) { | | |
| Shortened basic CID | 12 | 12 LSBs of the MS basic CID value |
| If(Sounding_Relevance_Flag==1){ | | |
| Sounding_Relevance | 1 | 0 = Respond in the frame carrying the instruction<br>1 = Respond in next frame |
| reserved | 3 | Shall be set to zero. |
| } | | |
| Subchannel offset | 7 | The lowest index subchannel used for carrying the burst, starting from subchannel 0 |
| Power boost | 1 | 0 = no power boost<br>1 = power boost |
| Number of subchannels | 3 | The number subchannels with subsequent indexes, used to carry the burst. |
| Periodicity | 3 | 0b000 = single command, not periodic, or terminate periodicity. Otherwise, repeat sounding once per r |

TABLE 2-continued

| Syntax | Size (bits) | Notes |
|---|---|---|
| | | frames, where $r = 2^{(n-1)}$, where n is the decimal equivalent of the periodicity field |
| Power Assignment Method | 2 | 0b00 = equal power; 0b01 = reserved; 0b10 = Interference dependent. Per subcarrier power limit; 0b11 = Interference dependent. Total power limit. |
| } | | |
| } | | |
| } | | |
| Padding | variable | Pad IE to octet boundary. Bits shall be set to 0 |
| } | | |

Regarding the UL_Sounding_Command_IE (Information Element) in Table 2, 'Extended-2 Uplink Interval Usage Code (UIUC)' of UL_Sounding_Command_IE is set to a value of '0x04' indicating the UL_Sounding_Command, and 'Sounding_Type' indicates a sounding zone allocation type. Sounding_Type 'A' directs the MS to transmit a specific sounding signal in a specific sounding symbol interval and includes specific sounding frequency band information occupied by the sounding symbol. Since sounding signals transmitted by a plurality of MSs may occupy the same frequency band, the Sounding_Type 'A' should contain cyclic shift information or decimation information to distinguish the sounding signals of the MSs. In case of Sounding_Type 'B', frequency bands are separately allocated to the respective MSs. In this case, to match the downlink (DL) subchannel structure, DL permutation information should be provided. Also, 'Sounding Relevance' information is carried, indicating Connection IDentifier (CID) information of the MS which has the allocated sounding zone and transmits the sounding signal, and indicating whether each MS sends the sounding signal in the same frame or the next frame of the UL_Sounding_Command_IE. Additionally, 'Periodicity' information is carried, which directs the MS to periodically send the sounding signal.

Meanwhile, in step 413 of FIG. 4, the RS 450 acquires sounding channel zone allocation information transmitted from the BS 410 to the MS 440 in UL-MAP. That is, the RS 450 can obtain CID information of each MS and sounding zone information allocated to each MS.

Next, the MS 440 sends a sounding signal in the allocated sounding channel zone in accordance with Tables 1 and 2 in step 415. Knowledge of the sounding channel zone allocated to the MS 440, allows the RS 450 to receive the sounding signal from the MS 440.

In step 417, the RS 450 measures an RS-MS signal level by receiving the sounding signal from the MS 440 in the sounding channel zone. The signal level can be a Signal to Interference and Noise Ratio (SINR) or a Received Signal Strength Indicator (RSSI). In step 419, the BS 410 measures a BS-MS signal level by receiving the sounding signal from the MS 440.

In step 421, the RS 450 reports the measured RS-MS signal level information to the BS 410. While the above description is provided of a single RS 450 reporting the RS-MS signaling information for ease of understanding, those of skill in the art will recognize that other RSs that know the sounding channel information allocated to the MS 440 can report their measured RS-MS signal level information to the BS 410.

Next, the BS 410 selects an RS suitable for the MS 440 using its measured BS-MS signal level information and the RS-MS signal level information received from the RS 450 in step 423. Accordingly, without recognizing the RS 450, the MS 440 can receive services from the RS 450.

When reporting the MS-RS signaling information to the BS 410 in step 421, the RS 450 can provide the BS 410 with signaling information relating to every MS that transmitted the sounding signal. Yet, the BS 410 selects some MSs eligible to receive the relay service via the RS 450 based on the MS information reported by the RS 450. Hence, it is preferred that the RS 450 merely reports information of an MS which has the signal level such as to be relay-serviced by the RS 450, without having to report information relating to every MS with which the sounding signal is monitored and the signal level is measured. However, since the RS 450 knows only its RS-MS signal level information and not another RS-MS or BS-MS signal level information, it is hard to determine whether the RS meets the signal level such as to provide the relay service to the corresponding MS or whether the MS should be reported to the BS based on the signal level. Therefore, a solution is needed for the BS 410 to determine a suitable signal level threshold to provide the relay service to the MS 400 from the RS 450 and to inform the RS 450 of the signal level threshold.

Figure 5:
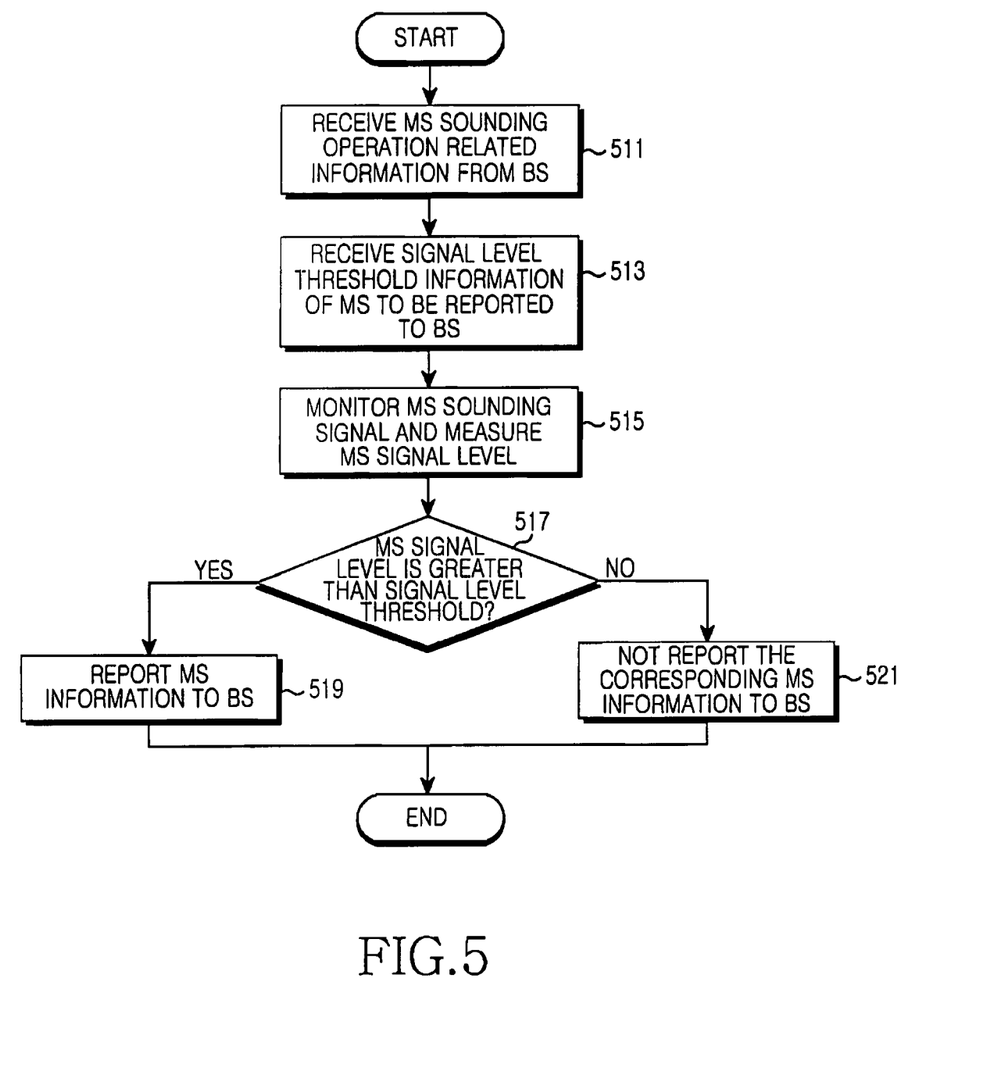
FIG. 5 depicts an RS's operation to report MS information which satisfies a signal level threshold of an MS in the multihop relay broadband wireless communication system according to the present invention.

FIG. 5 depicts an RS's operation to report MS information which satisfies a signal level threshold of an MS in the multihop relay broadband wireless communication system according to the present invention.

In step 511, the RS 450 receives PAPR_Reduction_Safety_and_Sounding_Zone_Allocation_IE of Table 1 and UL_Sounding_Command_IE of Table 2, which have been transmitted from the BS 410 to the MS 440. In step 513, the RS 450 receives signal level threshold information from the BS 410. The signal level threshold information can be received using an RS_control_information message. The RS_control_information message structure is shown in Table 3.

TABLE 3

| Syntax | Size (bits) | Notes |
|---|---|---|
| RS_control_information_Message_format{ | | |
| Management message type = TBD | 8 | to be determined |
| Signal level threshold | 5 | The MS's signal level threshold to be reported by the RS |
| Reserved | variables | Reserved; shall be set to zero |
| } | | |

In Table 3, the RS_control_information message includes type information of the transmitted message (Management message type) and signal level threshold information (Signal level threshold) of the MS to be reported by the RS. The signal level threshold can use a Carrier to Interference Plus Noise Ratio (CINR) value.

The RS_control_information message may be a unicast message transmitted from the BS to one RS, or a broadcast message transmitted to every RS. As for the broadcast message, the RS_control_information message can carry various control information transceived between the BS and the RS to support the relay service of the MS in addition to the MS signal level threshold information of the present invention, and can be transmitted using an RS Broadcast Connection Identifier (CID). The RS Broadcast CID is an ID used to distinguish the broadcast information sent to all RSs managed by the BS. The RS Broadcast CID is used when data is transmitted through a broadcast connection between the BS and the RS to provide necessary information or BS's instruction.

The RS Broadcast CID structure is shown in Table 4.

TABLE 4

| CID | Value | Description |
|---|---|---|
| RS Broadcast CID | TBD | Used for broadcast information that is transmitted on a downlink to all RSs. |

The RS Broadcast CID value is set by the system.

Alternatively, the signal level threshold information in step 513 of FIG. 5 can be provided as Type/Length/Value (TLV) of a Report Request (REP-REQ) transmitted from the BS 410 to the MS 450.

The signal level threshold TLV structure of the REP-REQ message is shown in Table 5.

TABLE 5

| Name | Type | Length (bytes) | Value |
|---|---|---|---|
| Signal level threshold | 1.4 | 1 | The MS's signal level threshold to be reported by RS |

As shown in Table 5, the signal level threshold TLV is a sub TLV of Report request TLV of the REP-REQ message sent from the BS to the RS. The signal level threshold TLV includes signal level threshold information of the MS to be reported by the RS. The signal level threshold can use a CINR value.

The REP-REQ message can be unicast to one RS or broadcast to all RSs capable of providing transparent relay service to the MS according to the present invention. It should be appreciated that the broadcast REP-REQ message can use the RS Broadcast CID. In this case, the RS sends the RS-MS signal level measurement result reporting message of step 421, rather than a Report Response (REP-RES) message, in reply to the REP-REQ message.

While it has been assumed that the MS sounding signal processing information of Table 1 or Table 2 is provided prior to the signal level threshold information of Table 3 or Table 5, the signal level threshold information can be provided prior to the MS sounding signal processing information of Table 1 or Table 2, according to the BS's determination.

While the MS sounding signal is illustrated by way of example, the BS can direct the RS to monitor a random UL signal of the MS. The MS's UL signal processing information including the MS sounding signal of Table 1 or Table 2 and the signal level threshold information of Table 3 or Table 5 can be provided to the RS 450 using the same message as shown in Table 6.

TABLE 6

| Field Name | Notes |
|---|---|
| UL region | MS UL region to be monitored by RS |
| Signal level threshold | The MS's signal level threshold to be reported by RS |

The message of Table 6 contains MS's UL signal region information to be monitored by the RS, and MS's signal level threshold information to be reported by the RS. The MS's UL signal region information corresponds to an UL region over which the MS transmits the MS sounding signal or random UL data. The RS measures the channel with respect to the MS's UL transmitted in the MS's UL signal region.

Next, the RS 450 monitors the sounding signal transmitted in the sounding channel zone from the MS 440 and measures a signal level value of the MS 440 in step 515 of FIG. 5. In step 517, the RS 450 checks whether the signal level value of the MS 440 is greater than the signal level threshold received from the BS 410 based on Table 3 or Table 5.

When the measured MS signal level value is determined to be greater than the signal level threshold in step 517, the RS 450 reports the signal level information of the MS 440 to the BS 410 in step 519. In doing so, the RS 450 acquires an UL band amount required to report the signal level information of the MS having the signal level greater than the signal level threshold to the BS 410. Herein, when the RS 450 receives from the MS 440 the bandwidth polling for the signal level information report of the MS 440 or needs to report the signal level information of the MS 440 without receiving the bandwidth polling, the RS 450 requests that the BS 410 allocate the acquired UL band amount and send to BS 410 information relating to an MS having the signal level value greater than the signal level threshold in the UL band allocated from BS 410. When the MS signal level value is determined not to be greater than the signal level threshold in step 517, the RS 450 does not to report the corresponding MS information to the BS 410 in step 521.

If taking into account several MSs in the coverage of the RS 450, before the step 519, the RS 450 requests to the BS 410 an UL band corresponding to the amount such as to report information as to MSs having the signal level value above the signal level threshold and the BS 410 allocates the requested band. Next, the RS 450 can report the information as to the MSs to the BS 410 over the allocated band.

Meanwhile, the signal level threshold, based on which the RS 450 selects an MS to be reported of to the BS 410, can be a fixed value known to the RS 450 at the initial installation. The RS 450 can utilize the signal level threshold to adjust the coverage of the RS by changing the signal level threshold based on Table 3 or Table 5 during the communication with the BS 410 and the MS 440. For instance, the signal level threshold is increased or decreased to reduce or raise the number of MSs manageable by the RS.

The BS can determine the signal level threshold by taking into account channel state between the BS and the RS and between the RS and the MS when the MS transmits and receives data via the RS, not directly to and from the BS. For instance, when the MS transceives data via the RS while the RS-MS signal level exceeds the BS-MS signal level, the BS can set the signal level threshold based on the signal level. At this time, the set signal level threshold should guarantee that the MS restore data by way of the RS.

Figure 6:
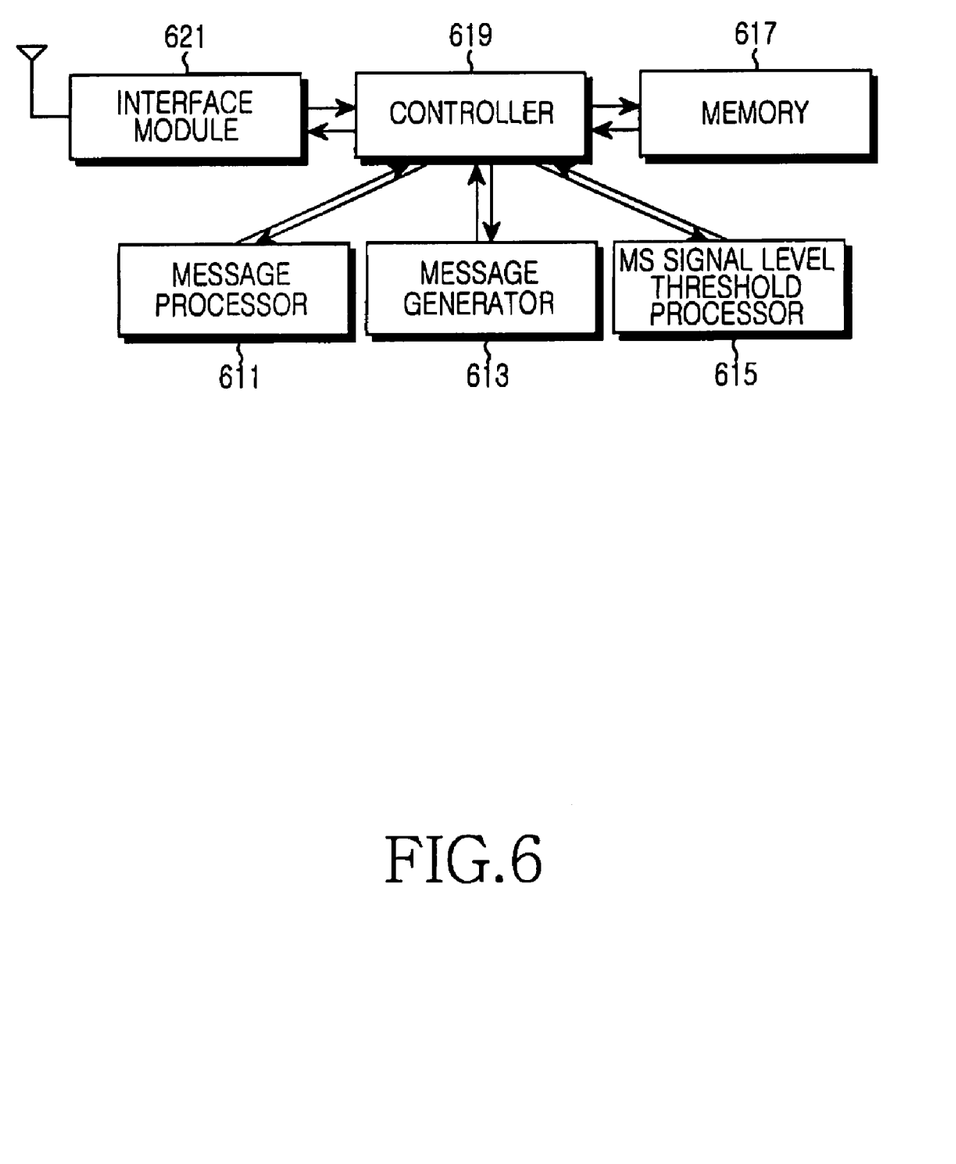
FIG. 6 is a block diagram of a BS (or RS) according to the present invention.

FIG. 6 is a block diagram of a BS (or RS) according to the present invention. Since a BS and an MS having the similar interface modules (communication modules) have the same block structure, their operation will be illustrated using one apparatus. The apparatus includes a message processor 611, a message generator 613, an MS signal level threshold processor 615, memory 617, a controller 619, and an interface module 621.

As for the RS in FIG. 6, the controller 619 controls overall operation of the RS. For instance, the controller 619 processes and controls voice telephony and data communication. In additional to the general functions, the controller 619 controls to process an MS signal level threshold applied to provide the transparent relay service according to the present invention. The controller 619, according to the present invention, provides a control message received from an MS or a BS to the message processor 611, receives from the message generator 613 a message destined for the MS or the BS, and provides the message to the interface module 621.

The message processor 611 decomposes the control message received from the MS or the BS and informs the controller 619 of its result. Upon receiving the RS_control_information message of Table 3 including the MS signal level threshold information or the REP-REQ message including the Signal level threshold TLV of Table 5 from the BS, the message processor 611 extracts various control information from the received message and provides the extracted information to the controller 619. Next, the controller 619 performs a corresponding processing according to the control information fed from the message processor 611.

The message generator 613 generates a message destined for the BS or an MS governed by the RS under the control of the controller 619, and provides the generated message to the controller 619. According to the present invention, the message generator 613 generates a channel state information reporting message containing MS information having the signal level greater than the MS signal level threshold and provides the generated message to the controller 619. The message generated at the message generator 613 is fed to the interface module 621 via the controller 619.

The MS signal level threshold processor 615 measures the MS signal level value for the received MS sounding signal according to the information instructed in the RS_control_information message of Table 3 or the Signal level threshold TLV of Table 5 under the control of the controller 619, and performs a function to select an MS having the signal level value above a certain level. Also, the MS signal level threshold processor 615 performs a function to acquire the UL band amount required to report the selected MS information having the signal level value above the certain value to the BS.

The memory 617 serves to store programs to control the overall operation of the RS, and temporary data generated during the program execution. Namely, the memory 617 can store data destined for the MS or the BS and control information.

The interface module 621 serves to communicate with the MS or the BS, and includes a Radio Frequency (RF) processor and a baseband processor. The RF processor converts a signal received over an antenna to a baseband signal and provides the baseband signal to the baseband processor, and converts a baseband signal from the baseband processor to an RF signal transmittable over the air and transmits the RF signal over the antenna. For instance, when using the BWA scheme, the baseband processor Fast Fourier Transform (FFT)-processes and channel-decodes a signal from the RF processor and applies the original information data (traffic or control message) to the controller 619. The baseband processor can, inversely, channel-code and Inverse FFT (IFFT)-process information data from the controller 619 and supply it to the RF processor.

Now, as for the BS in FIG. 6, the controller 619 controls overall operation of the BS. For instance, the controller 619 processes and controls voice telephony and data communication. In additional to the general functions, the controller 619 controls to process an MS signal level threshold applied to provide the transparent relay service according to the present invention. The controller 619, according to the present invention, provides a control message received from an MS or an RS to the message processor 611, receives from the message generator 613 a message destined for the MS or the RS, and provides the message to the interface module 621.

The message processor 611 decomposes the control message received from the MS or the RS and informs the controller 619 of its result. Next, the controller 619 performs a corresponding processing according to the control information fed from the message processor 611.

The message generator 613 generates a message destined for the MS or the RS under the control of the controller 619 and provides the generated message to the controller 619. According to the present invention, the message generator 613 generates the RS_control_information message of Table 3 including the signal level threshold information required to select an MS to be reported of by the RS to the BS or the REP-REQ message including the signal level threshold TLV of Table 5 and provides the generated message to the controller 619. The message generated at the message generator 613 is fed to the interface module 621 via the controller 619.

The MS signal level threshold processor 615 sets a signal level threshold which will be used to select an MS to be reported of to the BS after measuring the signal level of the sounding signal of the MS, and performs a function to inform the RS of the signal level threshold.

The memory 617 serves to store programs to control the overall operation of the BS and temporary data generated during the program execution. Namely, the memory 617 can store data destined for the MS or the RS and control information.

The interface module 621 serves to communicate with the MS or the RS, and includes an RF processor and a baseband processor. The RF processor converts a signal received over an antenna to a baseband signal and provides the baseband signal to the baseband processor, and converts a baseband signal from the baseband processor to an RF signal transmittable over the air and transmits the RF signal over the antenna. For instance, when using the BWA scheme, the baseband processor FFT-processes and channel-decodes a signal from the RF processor and applies the original information data (traffic or control message) to the controller 619. Inversely, the baseband processor channel-codes and IFFT-processes information data from the controller 619 and applies it to the RF processor.

In the RS or the BS as constructed above, the controller 619 controls the message processor 611, the message generator 613, and the MS signal level threshold processor 615. In other words, the controller 619 can function as the message processor 611, the message generator 613, and the MS signal level threshold processor 615.

As set forth above, when the BS utilizes the RS-MS channel state information to select an RS which will provide the transparent relay service to the MS in the multihop relay BWA communication system, the MS signal level threshold is defined and informed to the RS. Hence, it is possible to reduce overhead of the channel state information reporting message to be reported to the BS by the RS and the overhead of the UL band which is allocated for the transmission of the channel state information reporting message. Furthermore, by varying the MS signal level threshold according to the system and the channel condition, the RS coverage can be altered. The RS broadcast ID can be utilized to transmit the MS signal level threshold to the multiple RSs using the same message.

While the invention has been shown and described with reference to certain preferred embodiments thereof, it will be understood by those skilled in the art that various changes in form and details may be made therein without departing from the spirit and scope of the invention, as defined by the appended claims.

What is claimed is:

1. An operation method of a Relay Station (RS) for a transparent relay service to a Mobile Station (MS) in a multihop relay wireless communication system, the method comprising:
   receiving a signal level threshold of the MS from a Base Station (BS) using an RS control information message;
   measuring a signal level of the MS; and
   transmitting the signal level of the MS to the BS when the measured signal level is greater than the signal level threshold,
   wherein the signal level is at least one of Received Signal Strength Indicator (RSSI), and Carrier to Interference plus Noise Ratio (CINR),
   wherein the RS relays signals between the BS and the MS, which are incapable of transceiving signals directly with each other, and
   wherein a relay service of the RS is provided without informing the MS of the presence of the RS.

2. The operation method of claim 1, further comprising:
   acquiring sounding channel information of the MS from the BS.

3. The operation method of claim 2, wherein the signal level of the MS is measured using the acquired sounding channel information.

4. The operation method of claim 1, wherein transmitting the signal level comprises:
   requesting an uplink (UL) band corresponding to the measured MS signal level;
   allocating the UL band from the BS; and
   transmitting the measured MS signal level to the BS over the UL band.

5. The operation method of claim 1, wherein the RS control information message is one of a management message type and signal level threshold information.

6. The operation method of claim 1, wherein the RS control information is unicast or broadcast.

7. The operation method of claim 1, wherein the RS control information is transmitted using a broadcast Connection Identifier.

8. An apparatus for providing a transparent relay service to a Mobile Station (MS) in a multihop relay wireless communication system, comprising:
   a Relay Station (RS) for receiving a signal level threshold of the MS from a Base Station (BS) using an RS control information message, measuring a signal level of the MS, and transmitting the MS signal level to the BS when the measured signal level is greater than the signal level threshold; and
   the BS for transmitting the MS signal level threshold to one or more RSs and receiving MS signal levels from the RSs,
   wherein the signal level is at least one of Received Signal Strength Indicator (RSSI), and Carrier to Interference plus Noise Ratio (CINR),
   wherein the RS relays signals between the BS and the MS, which are incapable of transceiving signals directly with each other, and
   wherein a relay service of the RS is provided without informing the MS of the presence of the RS.

9. The apparatus of claim 8, wherein the BS transmits sounding channel information to the MS, measures the signal level of the MS using a sounding signal when the sounding signal is received from the MS, and selects an RS to provide service to the MS using the measured MS signal level and the MS signal levels received from the RSs,
   the MS receives the sounding channel information from the BS and transmits the sounding signal to the BS using the received sounding channel information, and
   the one or more RSs acquire the MS sounding channel information from the BS and measure the MS signal level through the sounding signal transmitted from the MS to the BS using the sounding channel information.

10. The apparatus of claim 8, wherein the RS requests an uplink (UL) band corresponding to the measured MS signal level to the BS, allocates the UL band from the BS, and transmits the measured MS signal level to the BS over the UL band.

11. A method for providing a transparent relay service to a Mobile Station (MS) in a multihop relay wireless communication system, the method comprising:
   transmitting, at a Base Station (BS), an MS signal level threshold to one or more Relay Stations (RSs) using an RS control information message;
   receiving, at the RS, the MS signal level threshold from the BS, measuring an MS signal level, and transmitting the MS signal level to the BS when the measured signal level is greater than the signal level threshold; and
   receiving, at the BS, MS signal levels from the one or more RSs,
   wherein the signal level is at least one of Received Signal Strength Indicator (RSSI), and Carrier to Interference plus Noise Ratio (CINR),
   wherein the RS relays signals between the BS and the MS, which are incapable of transceiving signals directly with each other, and
   wherein a relay service of the RS is provided without informing the MS of the presence of the RS.

12. The method of claim 11, further comprising:
   transmitting, at the BS, sounding channel information to the MS;
   receiving, at the MS, the sounding channel information from the BS and transmitting a sounding signal to the BS using the received sounding channel information; and
   receiving, at the BS, the sounding signal from the MS and measuring a signal level of the MS using the received sounding signal.

13. The method of claim 12, further comprising:
   acquiring, at the one or more RSs, the sounding channel information of the MS from the BS and measuring the MS signal level through the sounding signal, which is transmitted from the MS to the BS using the sounding channel information.

14. The method of claim 13, further comprising:
   selecting, at the BS, an RS to provide service to the MS using the measured MS signal level and the MS signal levels received from the RSs.

15. The method of claim 11, further comprising:
   requesting, at the RS, an uplink (UL) band corresponding to the measured MS signal level to the BS;
   allocating, at the BS, the UL band to the RS; and
   allocating, at the RS, the UL band from the BS.

* * * * *